United States Patent
Hede et al.

(10) Patent No.: US 9,963,625 B2
(45) Date of Patent: May 8, 2018

(54) COMPOSITE BODY AND METHOD OF MANUFACTURING IT

(71) Applicants: UPM-KYMMENE CORPORATION, Helsinki (FI); KWH Mirka Ltd, Jepua (FI)

(72) Inventors: Hans Hede, Vora (FI); Christer Kavander, Nykarleby (FI); Mats Sundell, Hirvlax (FI); Antti Laukkanen, Helsinki (FI)

(73) Assignees: UPM-KYMMENE CORPORATION, Helsinki (FI); KWH MIRKA LTD, Jeppo (FI)

( * ) Notice: Subject to any disclaimer, the term of this patent is extended or adjusted under 35 U.S.C. 154(b) by 24 days.

(21) Appl. No.: 14/916,236

(22) PCT Filed: Sep. 5, 2014

(86) PCT No.: PCT/FI2014/050680
§ 371 (c)(1),
(2) Date: Mar. 3, 2016

(87) PCT Pub. No.: WO2015/033025
PCT Pub. Date: Mar. 12, 2015

(65) Prior Publication Data
US 2016/0208153 A1    Jul. 21, 2016

(30) Foreign Application Priority Data

Sep. 5, 2013   (FI) ..................................... 20135896

(51) Int. Cl.
*B24D 3/20*      (2006.01)
*C09K 3/14*      (2006.01)
(Continued)

(52) U.S. Cl.
CPC ................ *C09K 3/14* (2013.01); *B24D 3/008* (2013.01); *B24D 3/20* (2013.01); *B24D 11/005* (2013.01);
(Continued)

(58) Field of Classification Search
CPC . C09K 3/14; C09K 8/14; B24D 3/008; B24D 3/20; B24D 11/005; C08L 1/02
See application file for complete search history.

(56) References Cited

U.S. PATENT DOCUMENTS 3,929,987 A * 12/1975 Colodney ............ A61K 8/0241
424/49
4,279,696 A * 7/1981 Piersol ................... D21H 23/48
162/146
(Continued)

FOREIGN PATENT DOCUMENTS

CN         102869831 A      1/2013
EP         2386683 A1      11/2011
(Continued)

OTHER PUBLICATIONS

International Search Report dated Dec. 18, 2014; International Application No. PCT/FI2014/050680; International Filing Date Sep. 5, 2014 (3 pages).
(Continued)

*Primary Examiner* — Pegah Parvini
(74) *Attorney, Agent, or Firm* — Cantor Colburn LLP

(57) ABSTRACT

Composite body comprises nanofibrillar cellulose (NFC) together with abrasive particles (AP). The nanofibrillar cellulose forms a 3-dimensional connecting network for the abrasive particles (AP). The abrasive particles have a hardness above 7 on Mohs scale. The composite body is used for grinding, polishing or cutting.

44 Claims, 11 Drawing Sheets

(51) Int. Cl.
  *B32B 17/06* (2006.01)
  *C09K 8/14* (2006.01)
  *D21H 11/18* (2006.01)
  *B24D 3/00* (2006.01)
  *B24D 11/00* (2006.01)
  *D21H 19/52* (2006.01)
  *C08L 1/02* (2006.01)
  *F16D 69/02* (2006.01)

(52) U.S. Cl.
  CPC .............. *B32B 17/067* (2013.01); *C08L 1/02* (2013.01); *C09K 8/14* (2013.01); *D21H 11/18* (2013.01); *D21H 19/52* (2013.01); *F16D 69/026* (2013.01)

(56) References Cited

U.S. PATENT DOCUMENTS

| | | | | |
|---|---|---|---|---|
| 5,051,303 | A * | 9/1991 | Noguchi | G11B 5/716 428/329 |
| 6,312,669 | B1 | 11/2001 | Cantiani et al. | |
| 7,803,740 | B2 * | 9/2010 | Bicerano | C09K 8/64 166/308.1 |
| 2004/0267006 | A1 | 12/2004 | Yamane et al. | |
| 2010/0233245 | A1 * | 9/2010 | Narayana | A01N 25/34 424/443 |
| 2011/0005142 | A1 | 1/2011 | Mase et al. | |
| 2011/0262731 | A1 * | 10/2011 | Mukai | C08K 5/098 428/292.1 |
| 2013/0096037 | A1 | 4/2013 | Bicerano et al. | |

FOREIGN PATENT DOCUMENTS

| | | |
|---|---|---|
| GB | 638668 | 6/1950 |
| JP | H0593183 A | 4/1993 |
| JP | 3639847 B2 | 4/2005 |
| JP | 2011074529 A | 4/2011 |
| WO | 2006072069 A2 | 7/2006 |
| WO | 2012107642 A1 | 8/2012 |
| WO | 2013004888 A2 | 1/2013 |

OTHER PUBLICATIONS

Written Opinion dated Dec. 18, 2014; International Application No. PCT/FI2014/050680; International Filing Date Sep. 5, 2014 (6 pages).

* cited by examiner

COMPOSITE BODY AND METHOD OF MANUFACTURING IT

CROSS-REFERENCE TO RELATED APPLICATIONS

This application is a National Stage application of PCT/FI2014/050680, filed Sep. 5, 2014, which claims the benefit of Finnish Application No. 20135896, filed Sep. 5, 2013, both of which are incorporated by reference herein in their entirety.

FIELD OF THE INVENTION

The present invention relates to composite body. The invention also relates to a method of manufacturing the composite body and use of the composite body.

BACKGROUND OF THE INVENTION

In many fields of workpiece processing, use is made of tools and materials, which comprise abrasive particles which are to be set in contact with workpieces to be processed. These tools and materials can be commonly designated "abrasive products". The processing may be polishing, grinding, cutting or other mechanical work. In these products, the abrasive particles, which are of sufficient hardness, are fixed to a support, which can take a variety of shapes.

One example of aforementioned tools is a grinding wheel. Grinding wheels are conventionally made of natural or synthetic abrasive particles fixed together in a matrix by means of binder. In manufacturing of a grinding wheel, the components (abrasive particles, binder) are mixed together and molded under pressure to achieve the desired shape and compact structure. After the molding, the binder is allowed to cure, or the grinding wheel is fired if the binder is ceramic.

Cutting wheel is another example of a tool which contains abrasive particles and which can be used for workpiece processing by cutting through material. The manufacture of a cutting wheel comprises similar steps as mentioned above. Some tools can be used both as grinding wheels and cutting wheels.

The abrasive materials also include various abrasive cloths, abrasive nets, abrasive 3-dimensional fiber materials, abrasive papers, abrasive filaments etc., where the support is in form of a textile or paper structure or film. These materials are flexible and can be used especially in polishing and surface finishing. In manufacturing these materials, abrasive particles are usually fixed on the supporting material with the help of a resin binder. Also metals and melted non organic materials such as glass can be used as binders.

Various organic binders, like phenolic resins, are commonly used to connect and stabilize abrasive grains in various grinding products, like in cutting wheels, grinding wheels etc. The resin has, however, a tendency to fill also the pores between the grains, decreasing the number of available edges of the abrasive grains for working the material. This will result in insufficient efficiency, and the surface containing the abrasive particles must be pressed harder against the workpiece to achieve the same result, which will cause excess heat from friction. Temperature stability of the resin phase is often relatively low and the product may break or degrade due to this excess heat arising from the friction. Different type of low density fillers, such as hollow spheres, are used to decrease the density in the product. The tendency is, however, that low density fillers have a negative influence on the strength of the end product.

Another problem in the manufacturing of abrasive products is heterogeneous distribution of the abrasive grains in the continuous matrix. This problem can be avoided by increasing viscosity of the unhardened composition, which may lead to problems in the deposition of the mixture eg. in spray coating of abrasive non wovens and cloths. Thus, there is a need for additive that can stabilize heavy grains and simultaneously allow easy spraying or coating of the formulation.

Porosity also allows room for small chips of metal, known as swarf, and abrasive generated during the grinding process. Porosity also provides pathways that carry fluids used to control heat and improve the cutting characteristics of the abrasive grains. Without adequate porosity and spacing between abrasive grains, the wheel can become loaded with swarf and cease to cut properly.

Thus, the problems associated with materials and tools where resin binders, such as commonly used phenolic resins are used for fixing the abrasive particles, is that the binder tends to fill the pores between the abrasive particles, which lowers the number of active grinding edges. If sufficient porosity can be created for example due to the structure of the support, the problem of even distribution of the particles, their fixation to the support, and the permanence of the fixation still remains.

SUMMARY OF THE INVENTION

The object is to provide a new composite body comprising binder and abrasive particles, which does not have problems associated with the prior art. A further object is to provide a composite body that can constitute or be part of an abrasive product. A further object is still to provide a composite body that can be used in applications where good friction is required.

It is also an object to provide a method for manufacturing a composite body which ensures sufficient porosity, if required, and consequently ensures a sufficient number of available edges of the abrasive particles, and also uniform distribution and firm fixation of the abrasive particles in the composite body.

The objects are achieved by using nanofibrillar cellulose (NFC) together with the abrasive particles in the composite body. The nanofibrillar cellulose can replace organic binders normally used in abrasive products either totally or partly. In the structure of the composite body, the nanofibrillar cellulose forms a continuous network of interconnected fibrils, which retain the abrasive particles physically and/or chemically through entangling the particles in the network. At the same time porosity, in the form of voids, are left inside the network of nanofibrillar cellulose. The network of the nanofibrillar cellulose, while fixing the particles in the composite structure, also leaves the particles well separated and prone to contact with the material to be worked.

In acting as the binder, the nanofibrillar cellulose has capability of self-orientation upon the removal of the liquid when the composite body is manufactured from a mixture of abrasive particles and liquid dispersion of NFC. The fibrils of the NFC tend to self-orientate in the direction of the particle surface. As the mixture dries and the composite structure under formation "shrinks" due to the removal of the liquid, the fibrils of the NFC draw the particles close to each other, which in turn orientates the fibrils in the direction of the draw, that is, perpendicularly to the particle surfaces. During this liquid removal, the NFC has the ability to arrange the abrasive particles and turn them into more favourable positions so that the particles are packed in a smaller volume compared to the case where they are allowed to settle freely without the NFC binder.

The same phenomenon occurs when the mixture is set on a substrate on which the composite body is to be formed and the fibrils of the NFC bind the abrasive particles to each other and to the substrate. The self-orientation of the NFC creates a very strong network of orientated fibrils binding the abrasive particles, which strive to become optimally arranged, together and to the possible substrate (support).

The abrasive particles can be used in various sizes and grades. Their hardness is as a rule higher than that of quartz, above 7 as expressed on the Mohs scale. The abrasive particles that can be used include for example aluminium oxide, silicon carbide, boron carbide, boron nitride, zirconia alumina, corundum, diamond and ceramic abrasives. Preferably the hardness is equal to or above 8.

Organic resin binder can be used in addition to the nanofibrillar cellulose in the binder component of the composite to increase water-resistance during the use of the abrasive product.

In the manufacture of the abrasive product, the abrasive particles and the nanofibrillar cellulose in liquid dispersion, usually aqueous dispersion, are mixed in a predetermined proportion, and the mixture is dried by a suitable method where the composite body attains its final shape. The mixture can be placed in a mold or in a press where it gradually loses the liquid and attains its final shape. The mixture can also be extruded through a die or forced through orifices or nozzle to air or to a suitable bath for drying. This technique allows to make elongate composite bodys, like yarns or filaments, which can be arranged to larger 2- or 3-dimensional structures or cut to shorter pieces.

The mixture can contain other ingredients besides the NFC and the abrasive particles, like the above-mentioned organic resin binder.

The NFC is obtainable in various chemically modified grades, especially ionically charged, which include anionically charged NFC, such as oxidized NFC (from catalytic oxidation by heterocyclic nitroxyl catalyst) and carboxymethylated NFC, and cationically charged NFC. The chemical constitution of the NFC can be utilized in improving the interaction between the abrasive particles and the fibrils of the NFC by ionic or covalent bonds, especially by choosing fibrils and particles of such surface charges that a charge complex can be formed from them, or by choosing such a chemical constitution that a covalent bond can be formed. Apart from possibilities of modifying the bond between the abrasive particles and the NFC, the ionic charge of the NFC can also be utilized in enhancing the drying rate of the mixture of the NFC and the abrasive particles.

The NFC can also be used for binding abrasive particles of very small dimensions. NFC dispersion and abrasive micrograins with sizes on the order of only 1 μm, possibly together with organic resin binder, can be mixed and molded to larger abrasive grains.

BRIEF DESCRIPTION OF THE DRAWINGS

In the following, the invention will be described in more detail with reference to the appended drawings, in which.

DETAILED DESCRIPTION OF THE EMBODIMENTS

Figure 1:
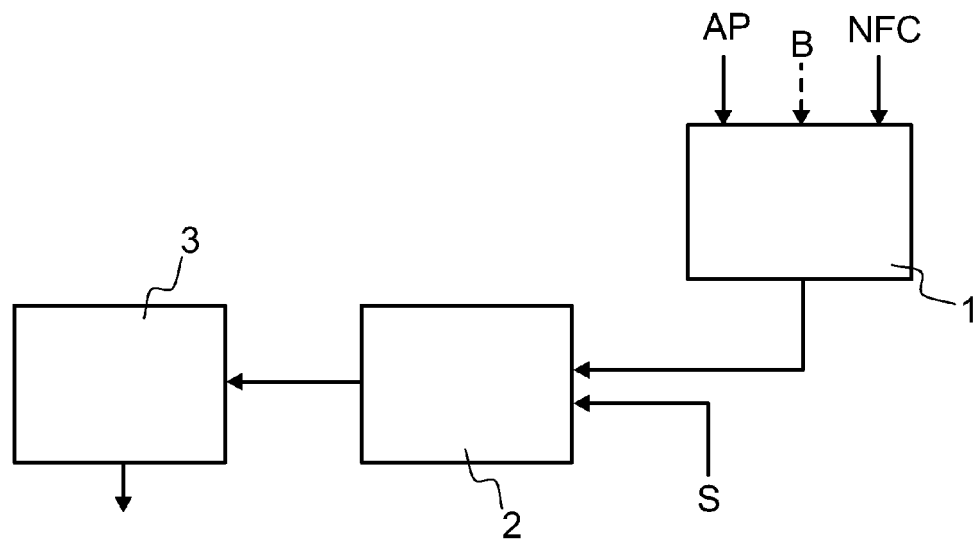
FIG. 1 shows the general principles of manufacturing the composite body.

In the following disclosure, all percent values are by weight, if not indicated otherwise. Further, all numerical ranges given include the upper and lower values of the ranges, if not indicated otherwise.

Components of the Composite Body

The main components of the composite body are abrasive particles, nanofibrillar cellulose (NFC), and optionally organic binder.

The abrasive particles have a hardness above 7 on Mohs scale, which is a well-known scale used for indicating the hardness of materials. The particles can be aluminium oxide, silicon carbide, boron carbide, boron nitride, zirconia alumina, corundum, diamond, or ceramic abrasive, or any mixture of these. However, the invention is not limited to just the above-mentioned particles. The particle sizes of the abrasive particles can vary according to the use, from 100 nm to 1000 μm, preferably 1 μm to 500 μm, expressed as weight average mean particle size. However, since the fibrils of the NFC have small dimensions and are able to entangle closely even small particles, the NFC makes possible to also use particle sizes below 10 μm, especially in miniaturized composite structures, like filaments, yarns and individual grains.

The particles can be physically or chemically modified, especially to alter their surface properties and/or chemical surface structure, such as surface charge. This modification is made especially to match the abrasive particles to the NFC grade used. For this purpose, the NFC may also be derivatized as explained hereinafter.

The term "nanofibrillar cellulose" (NFC) refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 μm. The smallest microfibrils are similar to so called elementary fibrils, which are typically 2-12 nm in diameter. The dimensions of the fibrils or fibril bundles are dependent on cellulose raw material and disintegration method. The nanofibrillar cellulose may also contain some hemicelluloses; the amount is dependent on the plant source. Mechanical disintegration of the cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. The cellulose raw material most commonly used is fibrous raw material obtained from plants.

The nanofibrillar cellulose is prepared normally from cellulose raw material of plant origin. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed.

The cellulose raw material could be also derived from cellulose-producing micro-organisms. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*. NFC can be directly isolated from certain fermentation processes of these microorganisms.

One preferred alternative is to obtain the microfibrils form non-parenchymal plant material where the fibrils are obtained from secondary cell walls. The source can be wood or non-wood plant material. Thus, wood fibers are one abundant source of the NFC. The nanofibrillar cellulose can be manufactured by disintegrating wood-derived or non-wood derived fibrous raw material to the level of microfibrils or microfibril bundles. The raw material can be for example chemical pulp. The pulp can be for example softwood pulp or hardwood pulp or a mixture of these. The fibrils originating in secondary cell walls are essentially crystalline with degree of crystallinity of at least 55%.

Nanofibrillar cellulose, irrespective of the cellulose source, can also be any chemically or physically modified derivate of cellulose microfibrils or micro-fibril bundles ("derivatized" NFC). The chemical modification could be based for example on carboxymethylation, oxidation, esterification, or etherification reaction of cellulose molecules. Modification could also be realized by physical adsorption of anionic, cationic, or non-ionic substances or any combination of these on cellulose surface. The described modification can be carried out before, after, or during the production of microfibrillar cellulose, or any combination of these processes. In the derivatized NFC, any hemicelluloses present may also be derivatized together with the cellulose domain.

The NFC can be especially ionically charged, because the ionic charge of the cellulose weakens the internal bonds of fibrous raw material and facilitates the disintegration to NFC. The ionic charge can be achieved by chemical or physical modification of the cellulose. The NFC can be anionically or cationiccally charged. Most commonly used chemical modification methods for making an anionic charge are oxidation and carboxymethylation. A cationic charge in turn can be created chemically by cationization by attaching a cationic group to the cellulose, such as quaternary ammonium group. Thus, the nanofibrillar cellulose is preferably made from fibrous raw material where the cellulose has been modified to ionically charged cellulose.

In the oxidation of cellulose, the primary hydroxyl groups of cellulose are oxidized catalytically by a heterocyclic nitroxyl compound, for example 2,2,6,6-tetramethylpiperidinyl-1-oxy free radical, "TEMPO". These hydroxyl groups are oxidized to aldehydes and carboxyl groups. Thus, part of the hydroxyl groups that are subjected to oxidation can exist as aldehyde groups in the oxidized cellulose, or the oxidation to carboxyl groups can be complete.

The existence of aldehyde groups in the NFC is advantageous in the sense that they are reactive and can be used for covalent binding. The fibrils of the NFC containing aldehyde groups can be bound covalently internally to NFC, to the abrasive particles, or to the possible substrate. The binding takes preferably place through acetal or hemiacetal formation reaction Various grades of NFC can be made depending on the type of the modification, such as kind of ionic charge (anionic/cationic), and/or kind of chemical agent or chemical process used in the modification. Various grades can also be made by altering the degree of modification. In case of oxidized cellulose, these grades can be expressed as carboxylate content, that is, as mmol COOH/g NFC (based on dry NFC), and in case of carboxymethylated NFC or cationized NFC, as degree of substitution. With anionic grades, in the oxidized cellulose the carboxylate content is preferably 0.3-1.5 mmol/g NFC, and in carboxymethylated NFC, the degree of substitution is preferably 0.05-0.3. With cationic grades, in the cationized NFC the degree of substitution is preferably 0.05-0.8.

In case of oxidized cellulose, the NFC can also contain aldehyde groups as the result of the oxidation, and these groups can be used in covalent bonding where they form hemiacetals and acetals. The aldehyde groups in the oxidiced cellulose can range from 0.08 to 0.25 mmol/g NFC.

The NFC used can also be unmodified. The unmodified NFC can be either untreated native or treated native where the positively charged counterions are changed to sodium. This pretreatment is preferably performed to fibrous raw material before its disintegration to NFC.

The NFC has characteristic rheological behaviour. The NFC, including all derivatized grades, is not soluble to water, but forms a gel already at relatively low consistencies (1-2%) when dispersed in aqueous medium (a hydrogel). The aqueous nanofibrillar cellulose dispersions obtained are also characterized by typical shear thinning behavior; that is, when the viscosity is measured in a rotational rheometer, the shear thinning behaviour is seen as a decrease in viscosity with increasing shear rate. The hydrogels of NFC also have plastic behaviour, that is, a certain shear stress is required before the material starts to flow readily. This critical shear stress is often called the yield stress. The viscosity of the NFC can be best characterized by zero-shear viscosity, which corresponds to the "plateau" of constant viscosity at small shearing stresses approaching zero. The zero-shear viscosity of the NFC measured with a stress controlled rotational rheometer at a concentration of 0.5% (aqueous medium) is typically between 1000 and 100000 Pa·s, preferably 5000 and 50000 Pa·s. For non-derivatized NFC this value is typically in the range of 1000-10000 Pa·s. The yield stress of the NFC determined by the same method is between 1 and 50 Pa, preferably in the range of 3-15 Pa.

The rheological characteristics make the a gel-like NFC dispersion ideal for carrier and dispersing medium of relative heavy (high-density) abrasive particles, because in static conditions it keeps the particles well distributed in the medium, but on the other hand the mixture can be made easily flowable by applying shear to it, for example when the mixture is spread on a substrate by spraying or by other means. Once the shear forces cease, the mixture is stable again.

Optional binders are organic binders, especially curable organic resins. Phenolic resins, such as phenol-formaldehyde resins, or urea-formaldehyde are preferably used. Other suitable binders include acrylic resins, latex, epoxy, polyimid, PEEK, cyanoacrylate, polyurethanes and sol-gel adhesives.

The surface of the composite body can be finished by means of so-called supersizers. Supersizers are functional additives that raise surface hardness, repellent and/or antistatic qualities, and they can be mixtures of two or more functional agents. Usually the supersizer contains binder. The supersizers can contain calcium stearate, zinc stearate, fluoroadditives, silanes and cutting fluid coolant.

Manufacturing Principle and General Structure of the Composite Body

FIG. 1 shows the basic principle of manufacture of the composite body. The manufacturing method includes mixing the abrasive particles AP and the nanofibrillar cellulose NFC to a liquid suspension, preferably aqueous suspension, in a mixing step 1. The addition of possible binder B is also shown. The resulting mixture comprises NFC and abrasive particles in a predetermined proportion. The amount of abrasive particles is higher than that of NFC calculated as dry substance. The nanofibrillar cellulose gel of relatively low consistency dispers the abrasive particles uniformly and the dispersion of the abrasive particles in the hydrogel of NFC is stable due to the rheological properties of the NFC, especially high zero-shear viscosity and high yield stress even at fairly dilute dispersions. The consistency of NFC to which the abrasive particles are mixed is 1-30%, preferably 1-4 wt-%.

Next, the shaping of the composite body from the above-mentioned mixture is started in a preliminary shaping step 2. The preliminary shaping step may comprise combining the mixture with a substrate S, which may be rigid or flexible. The combining can be carried out by a suitable coating method. The mixture can also be placed in a mold or in a press. In the preliminary shaping step, the liquid dispersion of NFC and abrasive particles is placed in contact with the structure that at least partly determines its final shape.

The preliminary shaping step 2 may also be forcing the mixture through orifices or a nozzle or extruding it through a die to make elongated structures.

After the preliminary shaping step, the liquid is removed from the mixture in a liquid removal step 3. If the dispersion of abrasive particles and NFC is an aqueous dispersion, the liquid removal step is dewatering the mixture. The liquid is removed while the mixture is on the substrate S or in the mold or press. Liquid removal may comprise removing liquid first by mechanical means, and final liquid removal by evaporation. In the liquid removal step, the composite body will obtain its final structure as to the mutual arrangement of the NFC and abrasive particles and the bonds between them.

After the liquid removal step, the composite body may be subjected to a finishing step. If the composite body exists on a substrate S, this step may include cutting this layered structure to pieces of smaller area to make the final abrasive products. Further, the finishing step can include assembling several composite bodies to final structure, especially in case of elongated bodies which can be formed to 2-dimensional or 3-dimensional structures.

The substrate S can be a solid-faced substrate or a substrate that has porosity, such as a non-woven or woven structure. Also a rigid substrate can have porosity. In case of porous substrates, the NFC binder is not absorbed by the pores because of the stability of the viscous mixture applied on the substrate, and it is available for binding the abrasive particles together and to the substrate in its original concentration.

Figure 2:
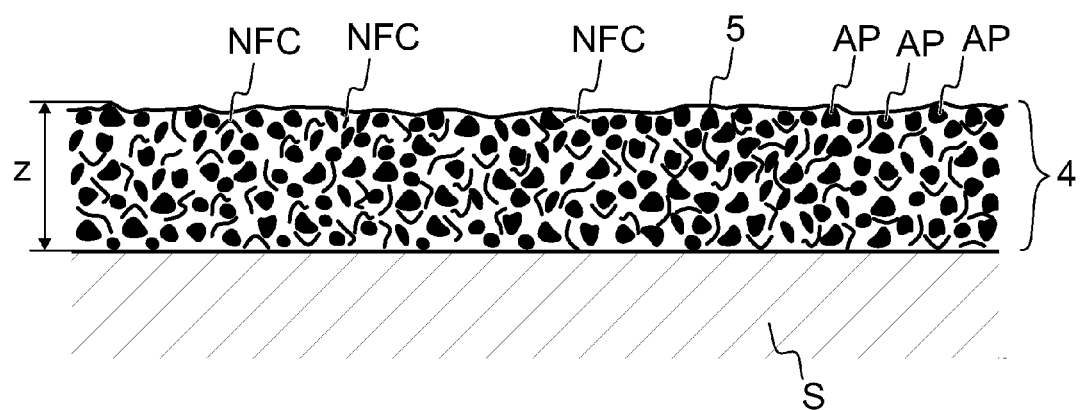
FIG. 2 shows the structure of a composite body that is part of an abrasive product.

FIG. 2 shows the composite body that is on a substrate as continuous layer 4 of approximately constant thickness z. The representation is schematic and shows the final structure where the abrasive particles AP and the fibrils of nanofibrillar cellulose NFC are evenly distributed throughout the thickness of the layer. The surface 5 of the layer may be covered by the fibrils, but they are rapidly removed when the surface is put in contact with a workpiece when the abrasive product is used for working materials.

Figure 3:
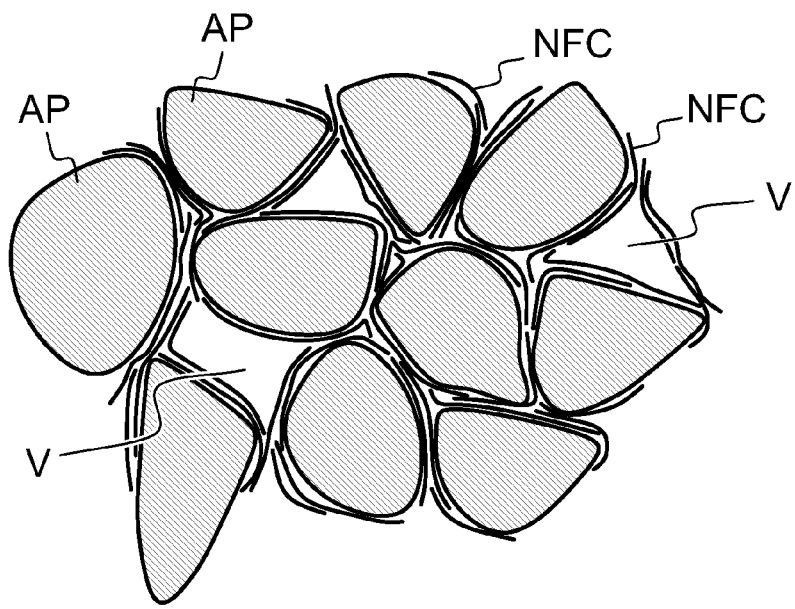
FIG. 3 shows the struture of a composite body in more detail.

FIG. 3 shows the structure in the inside of the composite body in closer detail. The abrasive particles AP are surrounded by the fibrils of the nanofibrillar cellulose NFC, which entagle and wrap the particles and join them together as permanent structure. The structure also contains empty spaces, voids V, between the particles AP and the fibrils. The proportion of voids V in the volume of composite body is determined by the shape and size of the particles AP and the ratio of particles to nanofibrillar cellulose on dry weight basis, which can be from 1:2 to 1:0.05 (w/w). Said ratio is above 1, preferably at least 2, if the purpose is to make structure of high porosity. The voids form preferably interconnected porosity in the composite body, that is, the voids are not closed-cell voids. The thickness of the fibril layer on a abrasive particle is considerably less than the size of the abrasive particle, which can be expressed as e.s.d. (equivalent spherical diameter). The particle sizes of the abrasive particles AP can vary in the wide limits as explained above. In FIG. 3, the size of the majority of the particles can be between 50-150 μm, whereas the thickness of the layer of NFC on the particles is only 5-15 μm.

The porosity of the structure caused by the voids V increase the efficiency of the composite body when it is used in working various materials, because the working edge of the abrasive particle AP protrudes better towards the material to be worked in polishing, grinding and cutting operations. This will increase the number of available edges on the surface which is to be put against the workpiece and increase the efficiency, and reduce the heat generated due to friction. The porous structure generates less friction, which means that the composite body does not become excessively heated, which might deteriorate the material. On the other hand NFC is heat-resistant and more elastic towards impacts, contrary to hardened organic resin binders which tend to be heat-sensitive and brittle.

Figure 4:
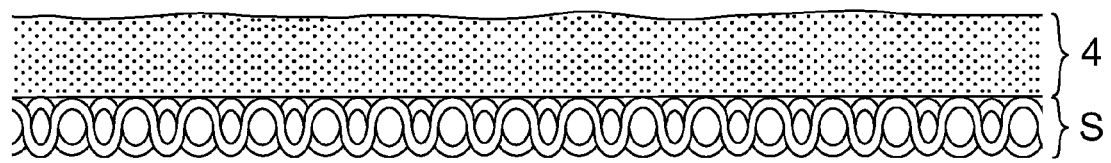
FIG. 4 shows an example of a composite body on a porous support.

FIG. 4 shows the composite body formed as a layer 4 on a porous substrate S, which in the figure is a densely woven cloth. The advantages of NFC as binder in layers set on porous substrates are discussed above. The porous substrate S may also be a knitted cloth, non-woven cloth, paper, or cardboard, and it can consist of several layers. The structure of FIG. 4, like the structure of FIG. 2, can be an abrasive product. Porous substrates are usually flexible to make flexible abrasive materials in form of bands etc. These materials are used especially for polishing and cleaning. It is for example possible to spray the mixture of NFC and abrasive particles on a non-woven cloth so that the mixture covers the fibers of the non-woven.

The substrate can be also more open net-like substrate so that when the mixture of NFC and abrasive particles is applied on it, the openings remain in the finished product, and the mixture covers only the individual strands around the openings. However, if these strands may be porous as such, the NFC can be said to have the same advantages as with porous substrates.

The substrate s can also be non-porous, such as the rigid substrate shown in FIG. 2, or non-porous but flexible substrate, which can be a closed-surface film, such as a plastic film. FIG. 2 can be thought to represent also a flexible substrate S.

The composite body can also be a freestanding body without a substrate to support it. Such bodies can be used as such as abrasive products in the form of discs, for example as grinding and cutting wheels. A circular disc-like abrasive product can also have the composite on a substrate of strong reinforcing material such as glass fiber. The total thickness of these disc-like products with or without support can be between 0.8-5 mm.

The composite body can form also a thicker circular disc-like product, such as grindstone, the thicknesses of which can range from 25 to 55 mm.

Figure 5:
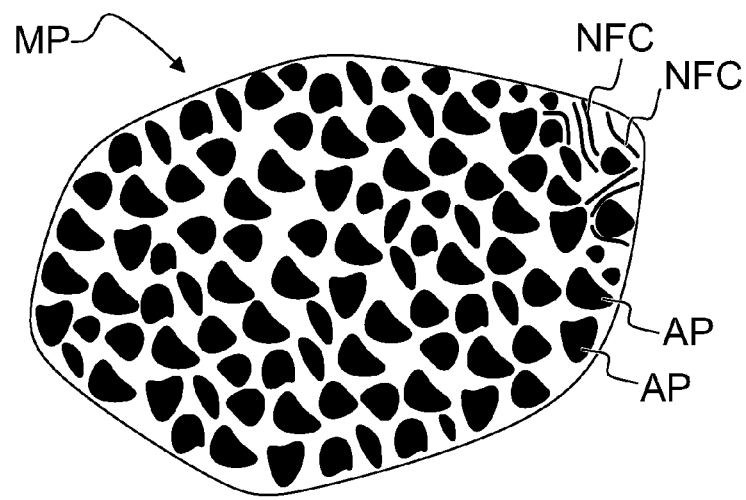
FIG. 5 shows a composite body in the form of a grain.

FIG. 5 shows a special example of a freestanding composite body, which is a microparticle composite MP. This composite contains abrasive particles AP, so-called microparticles, with the size on the order of 1 μm. Several particles AP are bound together with the fibrils of NFC (only some schematically shown) so that a composite body approximating the shape of an abrasive grain having working edges is formed. A synthetic resin binder is preferably also used in the mixture from which the microparticle composite is formed.

The microparticle composite MP can be formed as single "drops" or pieces of the mixture, casted in a mould, extruded or forced through orifices or a nozzle and cut, and then dried, or alternatively, a larger composite piece is formed and dried, and thereafter crushed to smaller pieces which form the grain-like microparticle composites MP. Especially when an elongated object is formed by extruding through a die or forcing the mixture through a nozzle or through orifices and it is subsequently cut to small pieces, angular shapes of the particles, having "corners", which is important for the function of an abrasive, can be formed. The mold can also have individual depressions which give angular shapes to the individual grains when the mixture is spread on the mold.

Liquid Removal Methods

The abrasive particles and possible other ingredients can be mixed to an aqueos dispersion (hydrogel) of NFC which is usually at consistency of 1-4%. However, these materials can be mixed to thicker "paste-like" dispersion of 10-30% consistency using efficient mixing.

The aqueous dispersion of NFC and abrasive particles, especially when it is started from relatively dilute dispersion, contains large amounts of water, which must be removed in the liquid removal step 2 in other ways than evaporation, to increase the production speed.

One possibility is to use pressure by placing the mixture in a press, and applying pressure through a pressing surface to cause water drain out of the mixture on the opposite side through a filter fabric that is impermeable to fibrils and abrasive particles. The dewatering is made more efficient by applying reduced pressure on the other side (filtrate side) of the filter fabric. The dewatering can be enhanced by using heat, preferably through the pressing surface that is heated. The final dewatering can take place by evaporation, possibly aided by heat, after the mixture has been removed from the press.

The filter fabric itself can be used as a substrate S, on which the composite body will be permanently fixed after the dewatering. In this case the mixture is not detached from the filter fabric.

Some grades of the nanofibrillar fibril cellulose are especially hard to dry because of their water retention capacity and the drying may take considerably longer than with for example more "native" grades which are not derivatized. Fibril cellulose containing anionically charged groups are one example of nanofibrillar cellulose dispersions that are particularly difficult. For example NFC where the cellulose is derivatized through N-oxyl mediated catalytic oxidation (e.g. through 2,2,6,6-tetramethyl-1-piperidine N-oxide, "TEMPO") or through carboxymethylation re specific examples of anionically charged nanofibrillar cellulose where the anionic charge is due to a dissociated carboxylic acid moiety. However, these anionically charged nanofibrillar cellulose grades are potential starting materials for the preparation of composite bodies, because high quality nanofibrillar cellulose dispersions are easy to manufacture from a suspension of fibrous material (pulp) where the cellulose is derivatized to contain anionically charged groups. The anionically charged nanofibrillar cellulose grades can be pretreated by lowering the pH of the dispersion by adding acid. This pretreatment reduces the water retention capacity. For example by lowering the pH of the fibril cellulose dispersion to below 3 the dewatering time can be considerably reduced. The pH of the mixture of derivatized NFC and abrasive particles can be reduced, whereafter the dewatering can proceed through pressing as described above. The dewatering can proceed in other ways as well after the pH has been reduced.

Figure 6:
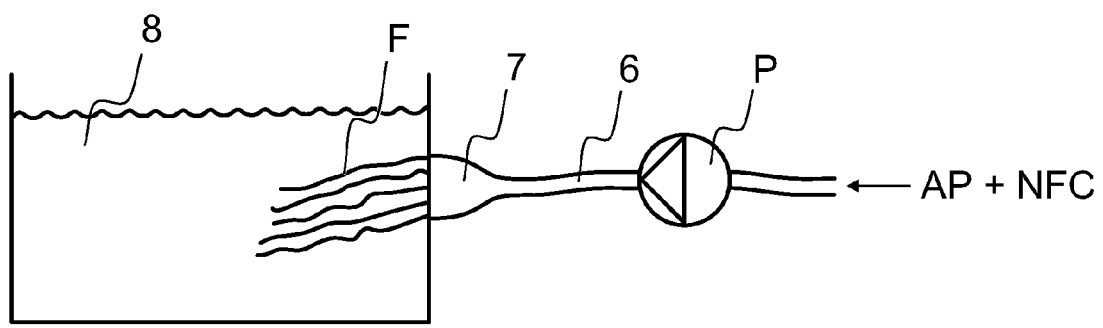
FIG. 6 is a specific example of manufacture of composite bodies.

FIG. 6 shows still one method which can be used for dewatering after the mixing step 1 where a hydrogel of NFC containing abrasive particles is formed. Water can be extracted from NFC hydrogel using a water-miscible liquid, e.g. ethanol as an extraction agent by a practical method which reduces the drying time and makes it possible to manufacture a variety of composite bodies and abrasive products starting from the NFC hydrogel.

Figure 7:
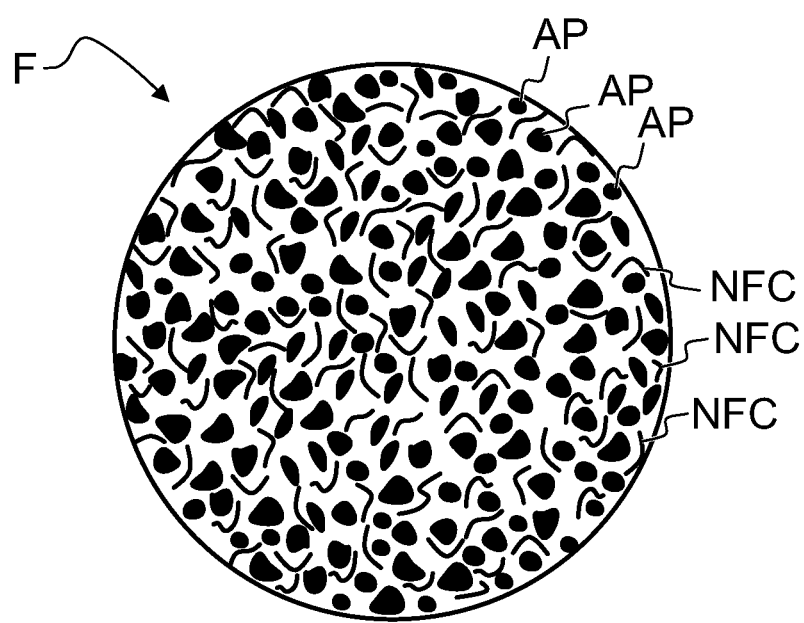
FIG. 7 is a cross-section of a composite body manufactured according to FIG. 6, and FIGS. 8-11 are microscopic pictures of composite bodies that comprise abrasive particles and that can be used as abrasive products or parts thereof

The NFC hydrogel, which may be obtained directly from the mixing step 1, is introduced into a water-miscible liquid 8 (organic extraction agent) so that it exists within the extraction agent as discrete physical entities. If an elongated body in the form of a yarn or filament is to be manufactured from the NFC hydrogel, the hydrogel is introduced into the extraction agent initially as continuous elongated objects, either as one individual elongated object or two or more objects in parallel. In FIG. 6, the mixture of abrasive particles AP and NFC is supplied by a pump P through a channel 6 to a bath containing a volume of the water miscible liquid 8. The mixture enters the water miscible liquid through a nozzle 7 having several orifices, which shape the mixture to several elongated filaments F. After drying, all these filaments F will contain the the abrasive particles AP and the fibrils of NFC binding them together, as shown schematically in FIG. 7 as cross-section of one individual filament F. The abrasive particles AP can be similar microparticles as in FIG. 5, which makes it possible to distribute abrasive particles uniformly in thin filaments as well, with diameter between 20-500 μm, preferably 100-300 μm, but the dimensions of the filaments and abrasive particles can be larger.

Alternatively, the hydrogel can be introduced in the water-miscible organic extraction agent as continuous, wider 2-dimensional object for manufacturing a composite body in the form of a film, which has preferably constant thickness. It is also possible to introduce the hydrogel existing at high water content on top of a substrate S as in FIG. 2 or 4 into the volume of organic extraction agent.

The form of the composite body depends on the way of supplying the NFC hydrogel into the extraction agent. The hydrogel can be supplied as a layer 4 which is on a substrate S as explained above, or it can be supplied through one or several orifices, which determine the cross-sectional shape of the elongate composite body. The hydrogel can also be supplied in discrete physical entities which form separate particles in the organic extraction agent, such as in form of droplets through a nozzle. The hydrogel is introduced in the organic extraction agent carefully so that it remains coherent and does not become dispersed, that is, a phase boundary of the gel against the extraction agent volume is retained the whole time after the contact of the hydrogel with the extraction agent. This technique can be used for example for forming the grain-shaped microparticle composites MP shown in FIG. 5.

Irrespective of the way of introducing the NFC hydrogel to the organic extraction agent, the water in the NFC hydrogel can be completely or partly changed to e.g. to the organic extraction agent, such as ethanol. In the second stage of the process, the extraction agent is removed for example in vacuum and/or elevated temperature (elevated temperature, if used, is a temperature higher than 25° C.), and essentially dry composite body is obtained. The drying can take place also by pressure filtration, the choice being dependent on the external dimensions of the composite body.

When the water is completely or partly exchanged with the extraction agent in the extraction agent volume, the physical entities keep their original shapes where the hydrogel was initially supplied to the extraction agent volume or the shapes they assumed after mechanical reduction to smaller size in the extraction volume, but the dimensions may change through shrinking. During this extraction agent exchange process, the fibrils of the NFC contained in the gel are stabilized to a coherent structure, where, however, a certain porosity exists. Due to this porosity the evaporation of the extraction agent or its removal in another way is easy after the physical entities are separated from the extraction agent volume. This porosity also allows the penetration of other constituents from the extraction agent. Other constituents can be introduced also after drying using the residual porosity of the physical entities.

The organic extraction agent to exchange with the water of the hydrogel is any liquid that is miscible with water and preferably has moderate polarity. Suitable extraction agents are organic liquids, preferably water-miscible alcohols including but not limited to methanol, ethanol, and isopropanol, as well as dioxane and THF. It is also possible to use two volumes of extraction agent successively for dewatering by exchange. The exchange of the water with the extraction agent leads to an enforcement of the hydrogen bonds between the NFC fibrils and to mechanical stabilization of the composite bodies being formed, irrespective of which form they assume in the extraction agent. Preferred extraction agent is ethanol, which has low toxicity, low heat of evaporation (904 kJ/kg vs. 2256 kJ/kg for water) and exothermic mixing reaction with water (−777 J/mol at 25° C.) which lowers the energy demand.

Still one way for the liquid removal is forcing the mixture of NFC and abrasive particles into air by forcing the mixture through a nozzle or by extrusion. The air is preferably heated to increase the liquid removal rate by evaporation. Extrusion can also be used for removing liquid at the same time through evaporation from the extruded mixture exiting the die and mechanically by extrusion pressure, which tends to drive liquid backwards along the extrusion screw. This technique can also be used when the mixture is extruded through a die into the organic extrusion agent.

According to one embodiment, water is removed from the mixture in non-solvent and non-acid conditions, that is, the dewatering takes place mechanically and/or by evaporation without the use of organic solvent and in neutral or slightly basic pH. This will maximize the aggregation potential of the fibrils of the NFC on drying.

According to one embodiment, the removal of water takes place totally by evaporation, especially in case of thin freestanding bodies or thin layers sprayed on a substrate.

It has been noticed that a more durable and tough structure is achieved, when the composite body is allowed to shrink freely (in unrestrained state) in the final stage of liquid removal, when the body turns from soft body to hard one.

The invention is described above mainly with reference to composite bodies that are to be used as abrasive products or parts of abrasive products. The invention is alo applicable to fields where resistant surface, especially heat resistant surface, with good frictional properties is required. Thus, the composite body can be used for example in brakes for causing braking friction, such as friction surfaces in disc brakes.

EXAMPLES

The following examples illustrate the method further. All amounts are expressed as dry substance. The abrasive particles (grains) used were aluminium oxide.

Example 1

Figure 8A:
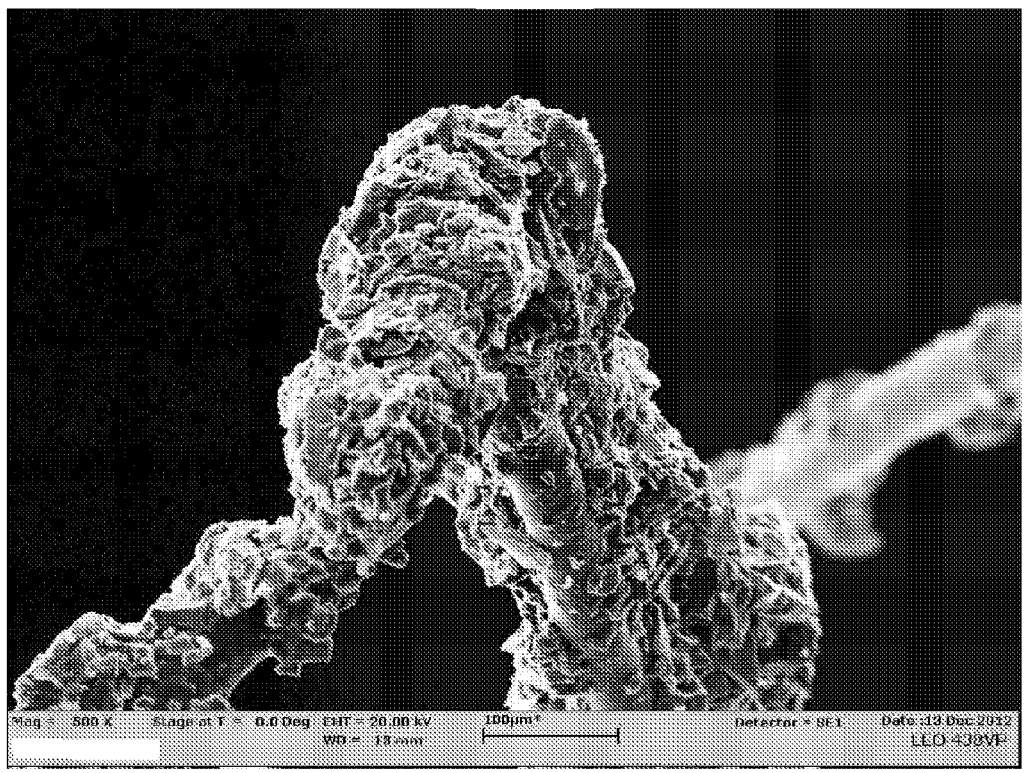
Figure 8B:
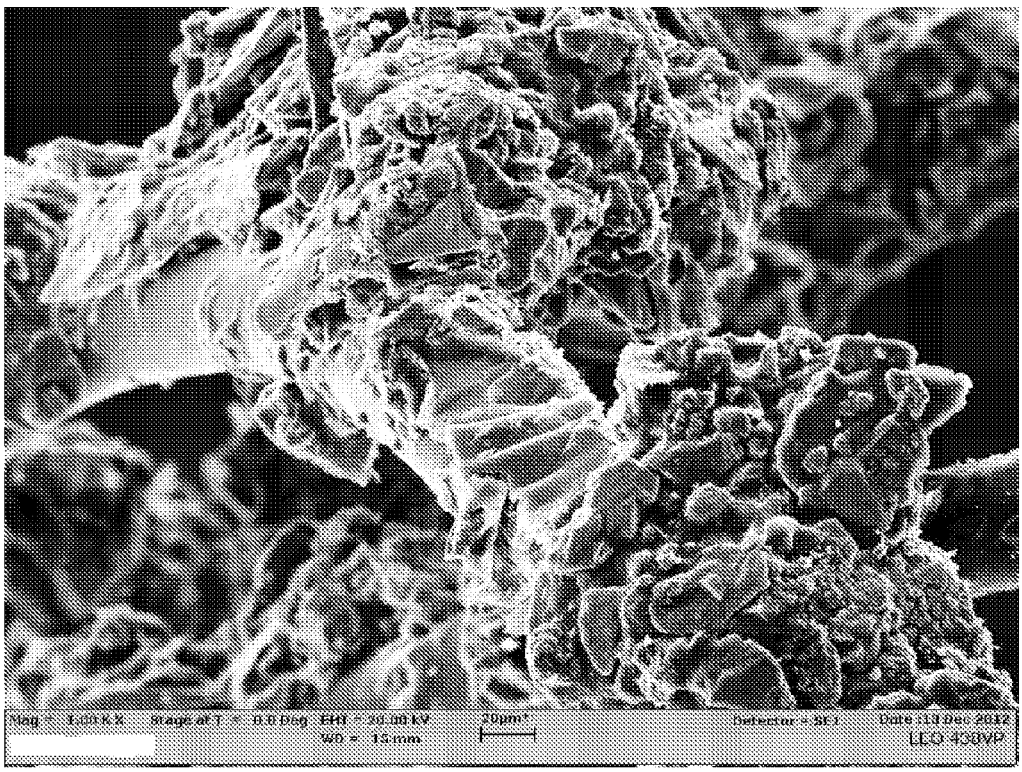

30 g phenolic resin
125 g grains
0.5 g NFC
Sprayed as Slurry on Nonwoven Material The SEM images (FIGS. 8a, 8b) show the structure of the dry composite body. The images show the abrasive particles held together and attached to fiber by the network of NFC.

Example 2

30 g phenolic resin
75 g grains
0.58 g NFC
Sprayed as Slurry on Fabric Material

Figure 9A:
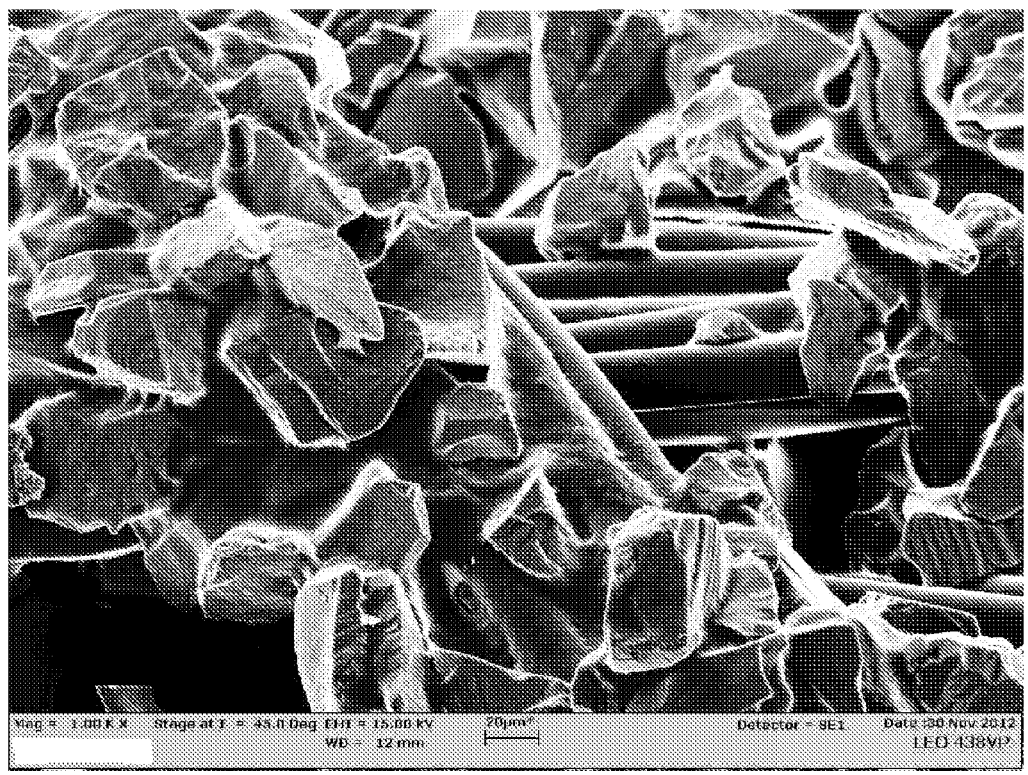
Figure 9B:
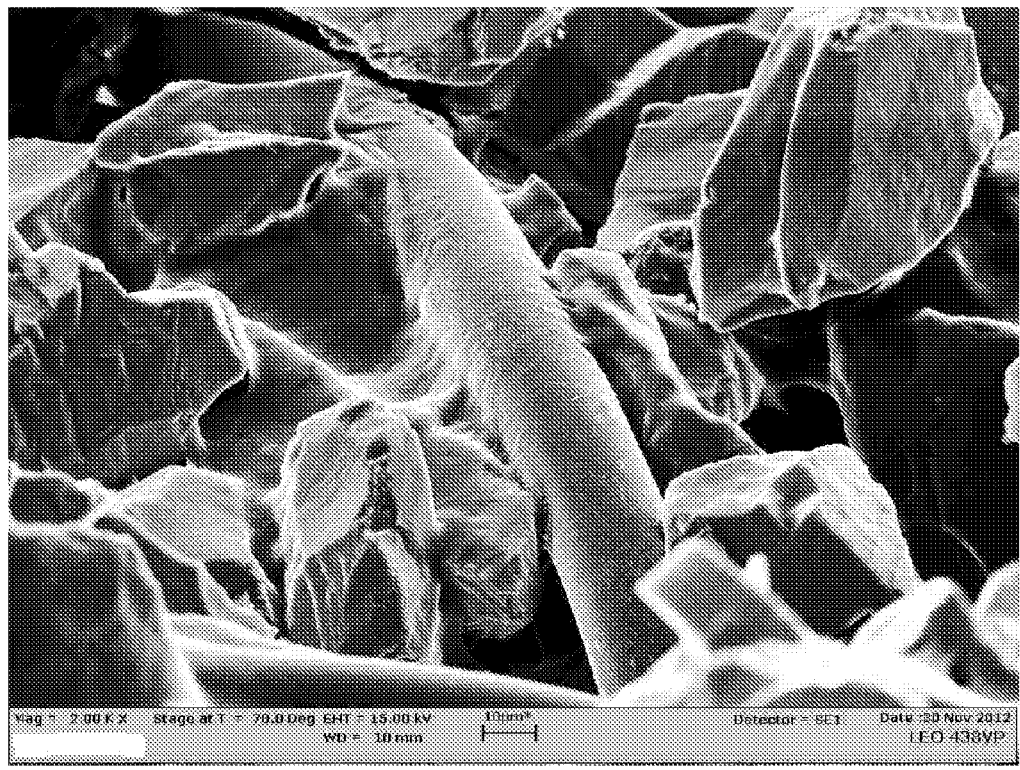
Figure 9C:
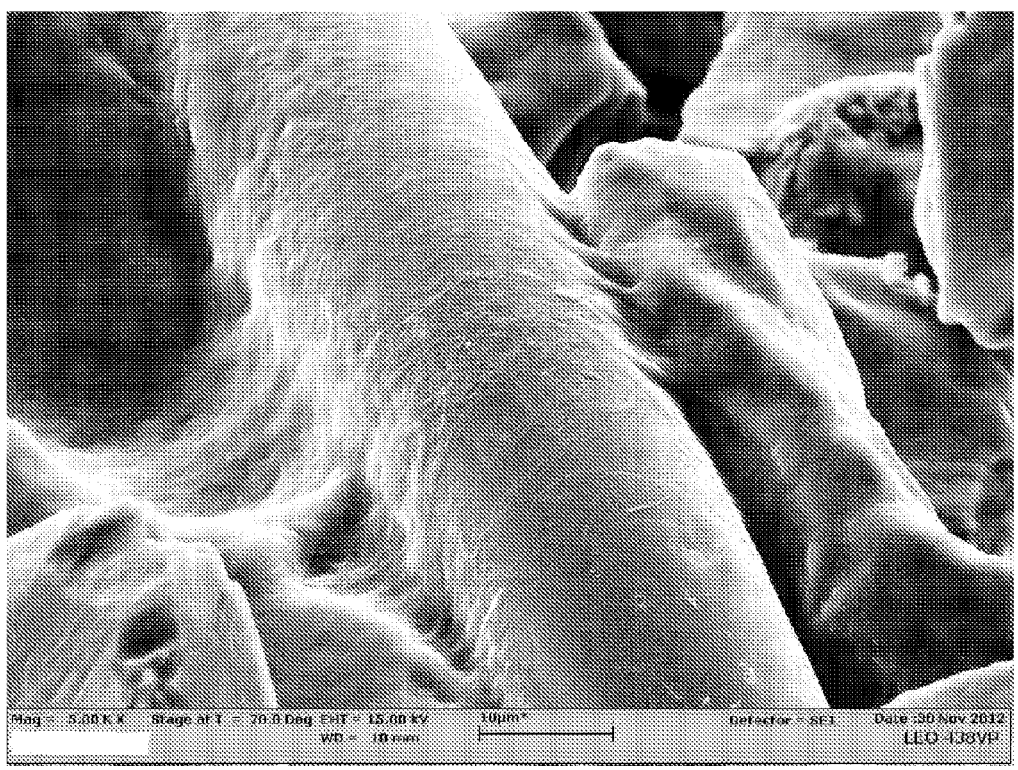
Figure 9D:
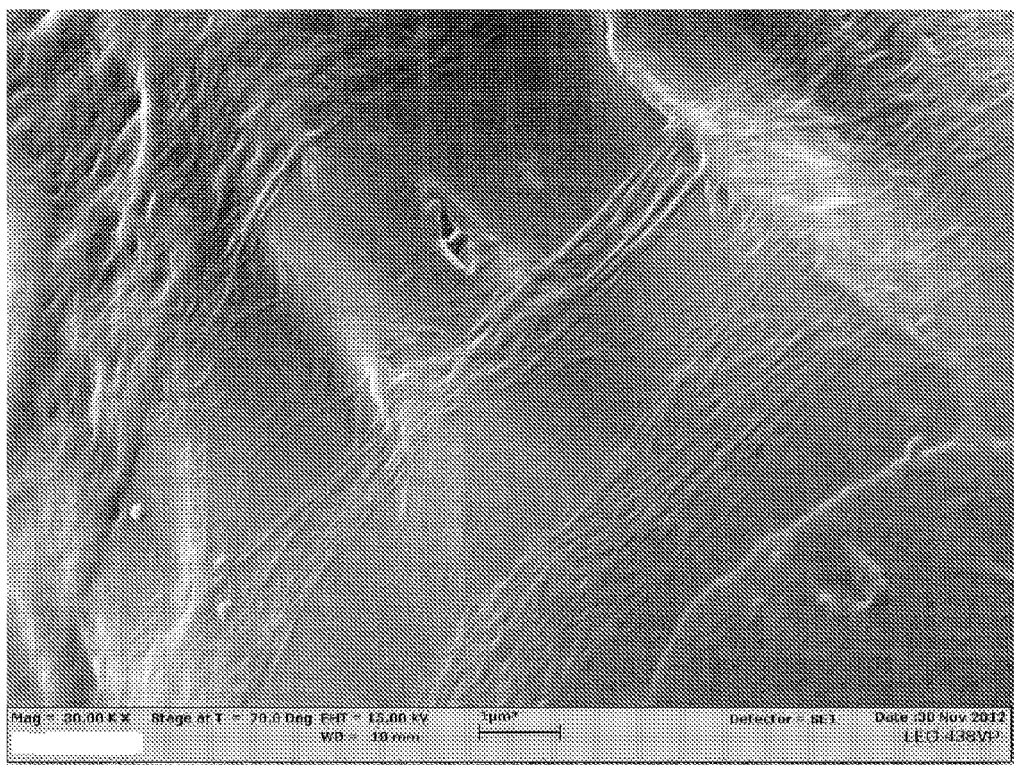

The SEM images (FIGS. 9a, 9b, 9c, 9d) show the structure of the dry composite body. FIGS. 9b, 9c, 9d show NFC and abrasive particles on fiber in different magnifications.

Example 3

10 g grains
4.6 g NFC
Molded and Dryed

Figure 10A:
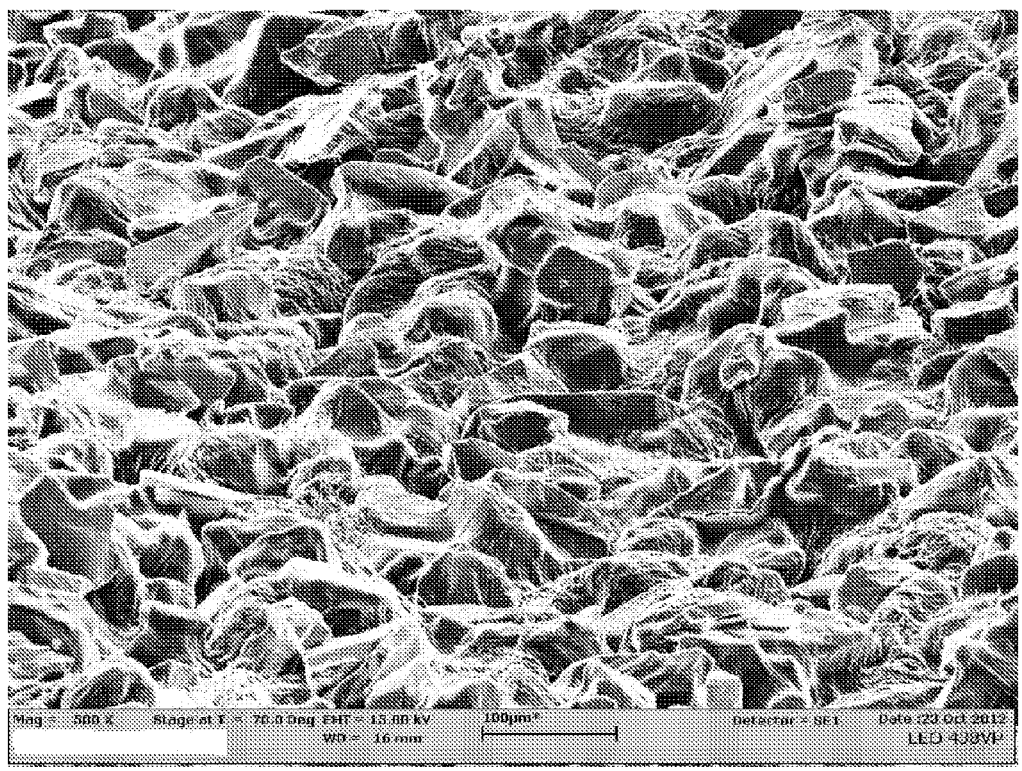
Figure 10B:
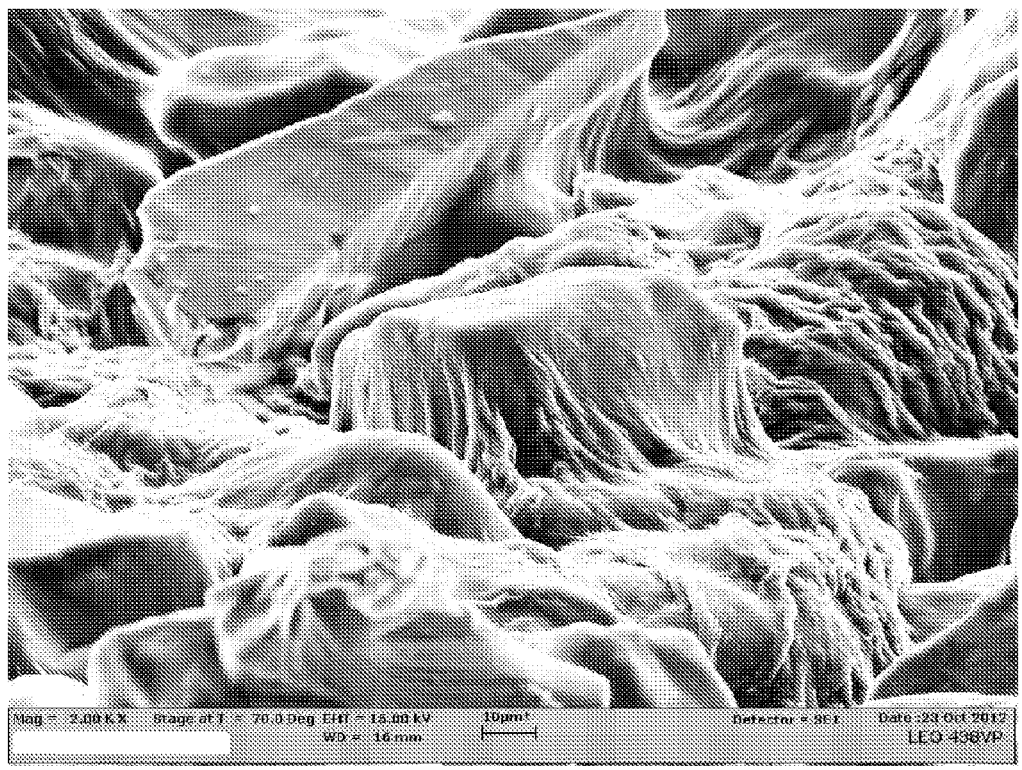
Figure 10C:
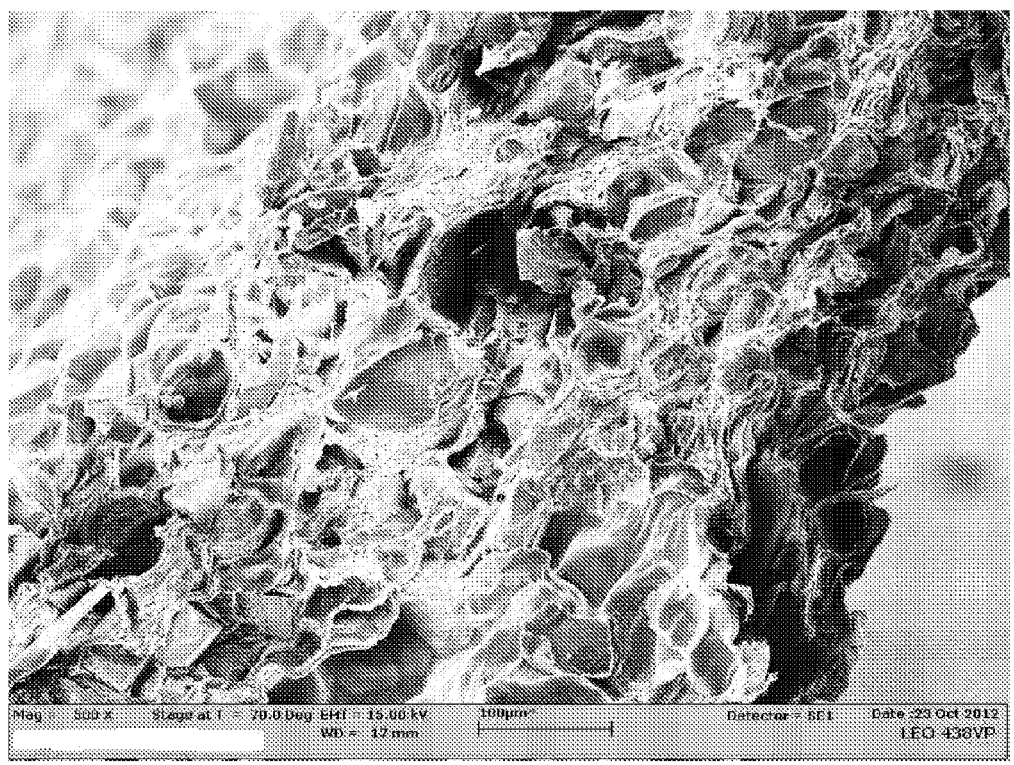
Figure 10D:
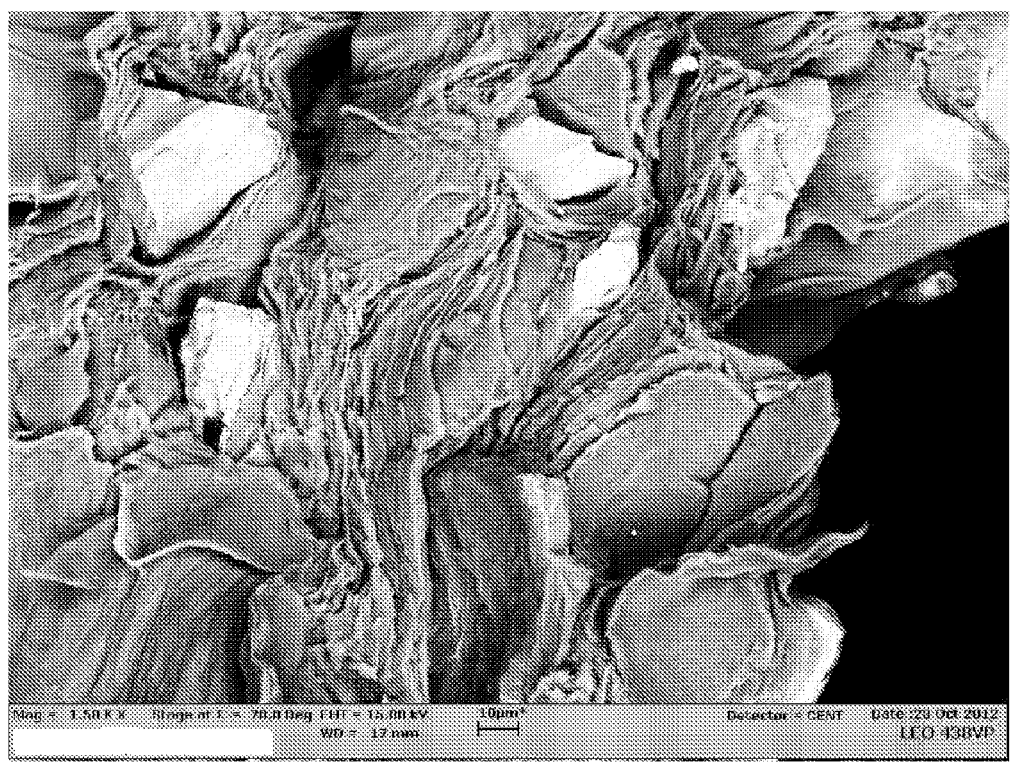

The SEM images (FIGS. 10a, 10b, 10c, 10d) show the structure of the dry composite body. FIG. 10a illustrates particularly well, how the network formed of fibrils of NFC surrounds the abrasive particles and bind them together. FIG. 10d is made with CENT-detector, which shows the abrasive particles as whiter bodies.

Example 4

("Brickwall")
7 g SiC grains+2.5 g NFC (dry on dry)

Figure 11A:
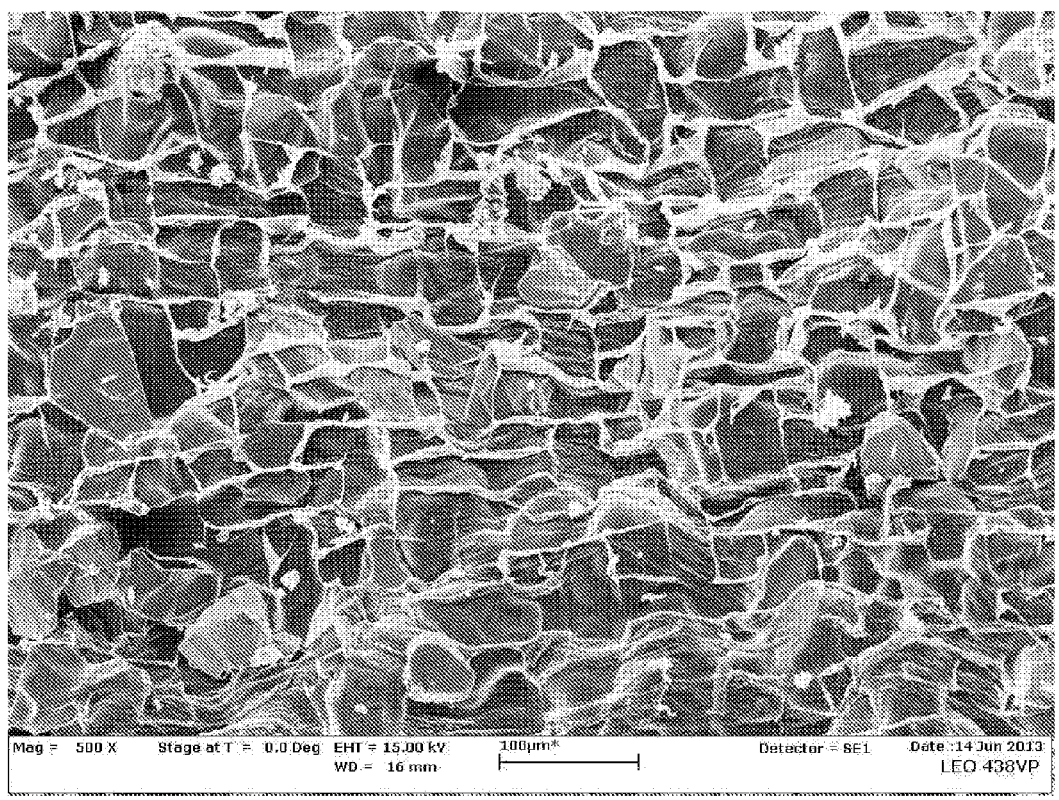
Figure 11B:
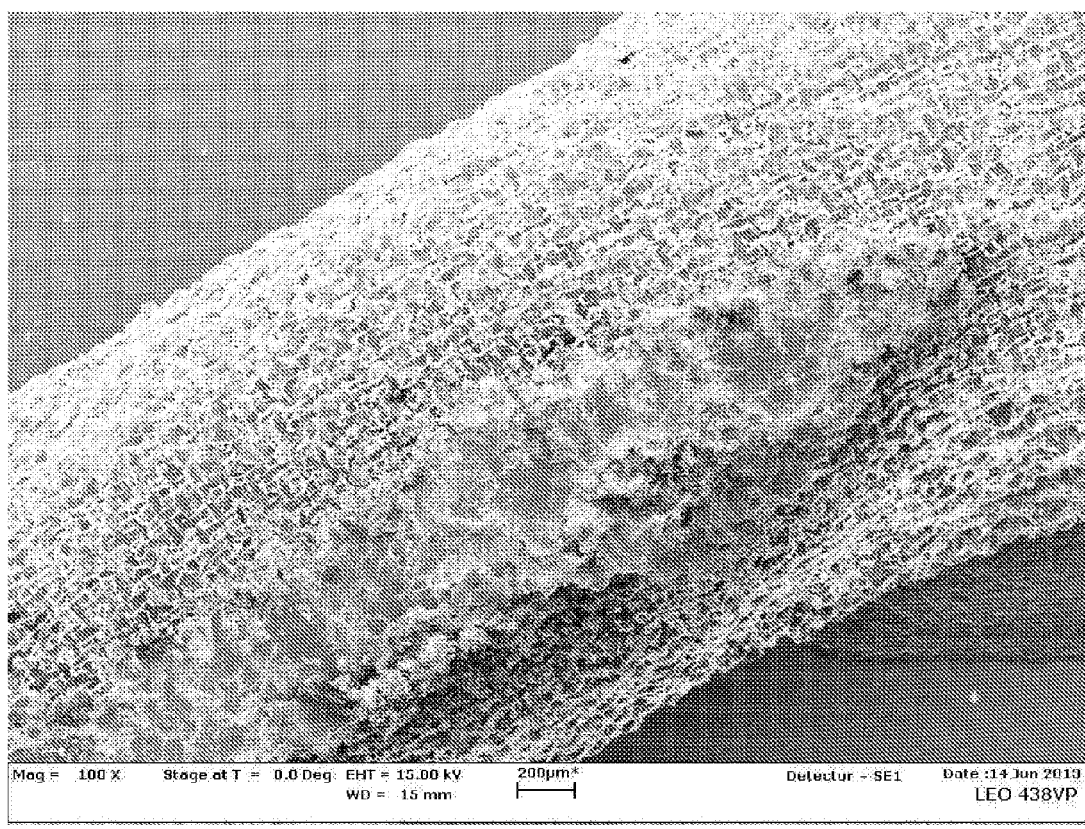

The SEM images (FIGS. 11a, 11b) show especially well a brickwork-like structure. In the images can be seen, how cube-like abrasive particles of silicon carbide are assembled to a compact structure by the effect of NFC, which binds the particles together. When the mixture dries, the volume occupied by the particles is minimized. This type of structure can be used in applications where porosity is not required, like in single abrasive grains using the principle shown in FIG. 5. The structure can be used also in non-abrasive applications, especially when durable surface is required, such as friction surface in a brake.

The invention claimed is:

1. A composite body comprising nanofibrillar cellulose (NFC) together with abrasive particles having a hardness above 7 on Mohs scale, said nanofibrillar cellulose forming a 3-dimensional connecting network for the abrasive particles, wherein the NFC is derivatized NFC.

2. The composite body according to claim 1, wherein the abrasive particles have a hardness of at least equal to or above 8.

3. The composite body according to claim 1, wherein the abrasive particles are selected from aluminium oxide, silicon carbide, boron carbide, boron nitride, zirconia alumina, corundum, diamond and ceramic abrasives.

4. The composite body according to claim 1, wherein the weight average mean particle size of the abrasive particles is 100 nm-1000 μm.

5. The composite body according to claim 1, wherein the composite body has voids in the structure formed by the connecting network of nanofibrillar cellulose and the abrasive particles.

6. The composite body according to claim 1, wherein the abrasive particles are at least partly surrounded by the NFC.

7. The composite body according to claim 6, wherein the abrasive particles are covered by the NFC also on the exterior surface of the composite body.

8. The composite body according to claim 5, wherein the voids of the composite body form interconnected porosity.

9. The composite body according to claim 1, wherein the structure formed by the connecting network of nanofibrillar cellulose and the abrasive particles is in the form of coating on a substrate.

10. The composite body according to claim 9, wherein the substrate is a rigid body.

11. The composite body according to claim 9, wherein the substrate is a flexible sheet-like body.

12. The composite body according to claim 9, wherein the substrate has porosity.

13. The composite body according to claim 1, wherein the structure formed by the connecting network of nanofibrillar cellulose and the abrasive particles is a freestanding structure, a sheet-like product, or a rigid body.

14. The composite body according to claim 1, wherein the body further comprises binder resin in the structure formed by the connecting network of nanofibrillar cellulose and the abrasive particles.

15. The composite body according to claim 1, wherein the NFC is an ionically modified cellulose.

16. The composite body according to claim 15, wherein the derivatized NFC forms an ionic bond or a covalent bond with the abrasive particles and/or with the possible substrate.

17. The composite body according to claim 15, wherein the abrasive particles form charge complex with the ionically modified cellulose.

18. The composite body according to claim 15, wherein the NFC is derivatized NFC containing aldehyde groups, which are bound covalently internally to NFC, to the abrasive particles, or to the possible substrate, preferably through acetal or hemiacetal reaction.

19. The composite body according to claim 1, wherein the ratio of abrasive particles to NFC, as dry matter, is between 1:2 and 1:0.05 (w/w).

20. The composite body according to claim 1, wherein the nanofibrillar cellulose is of plant origin.

21. A method for manufacturing a composite body comprising nanofibrillar cellulose (NFC), said method comprising mixing a liquid dispersion, especially an aqueous dispersion of NFC, and abrasive particles having a hardness above 7 on Mohs scale, and removing the liquid from the mixture of NFC and abrasive particles, wherein the NFC is derivatized NFC.

22. The method of claim 21, wherein removal of liquid from the mixture of NFC and abrasive particles is carried out at least partly by pressing.

23. The method of claim 22, wherein removal of liquid from the mixture of NFC and abrasive particles is carried out by pressing, whereafter the rest of liquid is removed by evaporation while the mixture is allowed to shrink freely.

24. The method of claim 21, wherein removal of water from the mixture of NFC and abrasive particles is enhanced by lowering the pH of the mixture.

25. The method of claim 21, wherein removal of water from the mixture of NFC and abrasive particles is enhanced by changing the water with water-soluble organic solvent, such as ethanol.

26. The method of claim 21, wherein over 50% of the liquid is removed by another way than evaporation, and the rest of the liquid is removed by evaporation.

27. The method of claim 21, wherein the mixture of NFC and abrasive particles is sprayed on a substrate.

28. The method of claim 27, where the liquid is removed by evaporation.

29. The method of claim 21, wherein the mixture of NFC and abrasive particles is forced through an orifice, nozzle or extruder die to an elongated object, and the liquid is removed from the elongated object.

30. The method of claim 21, wherein a circular disc having a total thickness of 0.8-5 mm is made from the mixture alone or mixture and substrate.

31. The method of claim 21, wherein the nanofibrillar cellulose is of plant origin.

32. A method for treating workpieces comprising using the composit body of claim 1 wherein the treating is grinding, polishing or cutting.

33. The method of claim 32, wherein the treating is cutting glass or metal.

34. A method for friction surface in braking comprising using the composite body of claim 1 in brakes.

35. The composite body according to claim 1, wherein the weight average mean particle size of the abrasive particles is 1-500 μm.

36. The composite body according to claim 9, wherein the substrate comprises a textile substrate.

37. The composite body according to claim 36, wherein the textile substrate comprises a woven, knitted or non-woven cloth.

38. The composite body according to claim 9, wherein the textile substrate comprises paper or cardboard.

39. The composite body according to claim 13, wherein the freestanding structure is in the form of grains, yarns, filaments, or a textile structure made of said yarns or filaments.

40. The composite body according to claim 13, wherein the rigid body is a disc.

41. The composite body according to claim 14, wherein the binder resin, comprises formaldehyde resin, urea formaldehyde, or phenol formaldehyde in the structure formed by the connecting network of nanofibrillar cellulose and the abrasive particles.

42. The composite body according to claim 15, wherein the ionically modified cellulose is anionically or cationically modified cellulose.

43. The method of claim 21, wherein the abrasive particle have a hardness at least equal to or above 8.

44. The method of claim 21, wherein the liquid is water.

* * * * *